Patented Aug. 21, 1928.

1,681,657

UNITED STATES PATENT OFFICE.

OSCAR E. BRANSKY, OF WHITING, INDIANA, ASSIGNOR TO STANDARD OIL COMPANY, OF WHITING, INDIANA, A CORPORATION OF ILLINOIS.

OIL-SOLUBLE NAPHTHENIC COMPOUND.

No Drawing. Application filed October 29, 1923. Serial No. 671,478.

The present invention relates to the separation of acid bodies from hydrocarbon oils, the acid bodies being characterized in that their alkali metal salts show a preferential solubility in oil in the presence of oil and water.

The present invention is more particularly applicable to naphthenic oils and distillates such as those obtained from the Gulf Coast fields, and especially from the fields in Louisiana.

The process may be applied directly to the oils, or to distillates therefrom. It will be described specifically hereinafter in connection with the treatment with a distillate from such crude oils.

A lubricant distillate may be prepared from a crude oil of the character described by any suitable process, the distillate having, for example, a flash point of about 500° F. and having a viscosity of 200 seconds Saybolt at 100° F., or higher. When such a distillate is treated with an alkali solution, for example, a soda solution, it is found that there is a strong tendency to emulsification, apparently due to the formation and presence in the oil of salts of certain acid bodies of a very different character from those normally removed by alkali washing in ordinary refining processes.

A distillate, or other oil, of the character set forth, is treated with alkali, any suitable soluble alkali, such as soda ash being used. A 10 to 20% solution may be employed, and, in treating the oil, sufficient is added, say from 5 to 20% to completely neutralize the oil. The oil is then thoroughly agitated with from 10 to 20% of alcohol having a concentration of at least 50% alcohol, the remainder being water. I have found that any of the lower alcohols which, when diluted with water are insoluble in oil, may be employed and particularly the methyl, ethyl and isopropyl alcohols have been found to be satisfactory. The alcohol extract is removed, and the washing with the alcohol solution may be repeated one or more times, as found desirable. The alcohol extracts, which may be combined, if desired, are then subjected to distillation for removal of the alcohol, the naphthenic acid compounds remaining as a residue. They are semi-solid, viscous or pasty and reddish in color in their crude state, but on treatment with acid and distillation with steam form viscous, oily acid bodies of a pale yellow color having a slight pleasant odor. They combine with alkalies, forming salts. Alkali metal salts are found to have detergent properties; the salts of most other metals are insoluble in water. The copper salt is green in color and has excellent preservative properties. It may be dissolved in a suitable vehicle, such as naphtha and applied as varnish or stain, forming a film which gradually hardens. A 10% solution of copper salt has been found suitable for this use.

These naphthenic bodies may also be removed in the acid state by washing the oil with the dilute alcohol in the manner described without prior alkaline treatment. If desired, the oil, or the distillate therefrom, may be treated with a suitable treating agent, such as sulfuric acid, prior to the removal of the acid bodies of the type hereinbefore referred to. After removal of the acid sludge, on treatment of the residual oil with alcohol in the manner above set forth, these acid bodies may be obtained in admixture with the preferentially oil soluble or mahogany sulfonic acid bodies. If desired, in either case, the oil (before acid treatment) or the acid treated oil may be subjected to washing with a suitable alkali solution, for example, a 10 to 20% soda solution, and the sodium salts of the said bodies referred to may then be removed by treatment with alcohol.

I claim:

1. The method of preparing naphthenic acid bodies from oils which comprises treating such oils with aqueous alkali solutions and washing the oil with a diluted alcohol.

2. The method of preparing naphthenic bodies from oils which comprises treating the oil with a dilute alkali solution, washing the oil with a diluted alcohol, and separating the naphthenic bodies from the alcohol.

3. The method of preparing naphthenic bodies from oils which comprises neutralizing the oil, washing the oil with a 50% aqueous solution of an alcohol having less than four carbon atoms, and separating the naphthenic bodies from the alcohol.

4. The method of refining a naphthenic oil distillate which comprises washing such an oil with diluted alcohol.

5. The method of refining a naphthenic oil distillate which comprises neutralizing such an oil with alkali, and washing the neutralized oil with a diluted alcohol.

6. Naphthenic acids derived from naphthenic oil characterized in that they are viscous, oily bodies of pale yellow color, having a slight odor, and the alkali metal salts of which are preferentially soluble in oil in the presence of aqueous alkali solutions.

OSCAR E. BRANSKY.